United States Patent
Kim et al.

(10) Patent No.: US 9,300,559 B2
(45) Date of Patent: Mar. 29, 2016

(54) MESSAGE PROCESSING METHOD OF GATEWAY

(71) Applicant: Hyundai Motor Company, Seoul (KR)

(72) Inventors: Dong Won Kim, Seoul (KR); You Keun Kim, Hwaseong-si (KR); Sung Ho Choi, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 97 days.

(21) Appl. No.: 14/105,050

(22) Filed: Dec. 12, 2013

(65) Prior Publication Data

US 2015/0049774 A1 Feb. 19, 2015

(30) Foreign Application Priority Data

Aug. 14, 2013 (KR) ................... 10-2013-0096479

(51) Int. Cl.
| | |
|---|---|
| *H04J 3/06* | (2006.01) |
| *H04L 12/26* | (2006.01) |
| *H04L 12/40* | (2006.01) |
| *H04L 12/64* | (2006.01) |
| *H04L 7/00* | (2006.01) |

(52) U.S. Cl.
CPC ........... *H04L 43/0858* (2013.01); *H04J 3/0658* (2013.01); *H04L 12/40* (2013.01); *H04L 12/6418* (2013.01); *H04J 3/0682* (2013.01); *H04L 7/0041* (2013.01)

(58) Field of Classification Search
USPC ......... 370/252, 503, 338, 350, 356, 401, 448, 370/516; 455/181.1; 375/356
See application file for complete search history.

(56) References Cited

U.S. PATENT DOCUMENTS

| | | | | |
|---|---|---|---|---|
| 6,067,045 | A | * | 5/2000 | Castelloe et al. ........ 342/357.43 |
| 8,438,249 | B2 | * | 5/2013 | Urano .................... G04G 5/002 370/236 |
| 2004/0037238 | A1 | * | 2/2004 | Schiff et al. ................... 370/321 |
| 2008/0084837 | A1 | * | 4/2008 | Watanabe et al. .............. 370/312 |
| 2010/0202436 | A1 | * | 8/2010 | Albert et al. .................. 370/350 |
| 2013/0059592 | A1 | * | 3/2013 | Chakraborty et al. ........ 455/444 |
| 2013/0226357 | A1 | * | 8/2013 | Ersavas et al. ................ 700/284 |

FOREIGN PATENT DOCUMENTS

| | | |
|---|---|---|
| JP | 2007-28499 A | 1/2007 |
| JP | 2009-027358 A | 2/2009 |
| KR | 10-2008-0087640 A | 10/2008 |

(Continued)

*Primary Examiner* — Phuongchau Ba Nguyen
(74) *Attorney, Agent, or Firm* — McDermott Will & Emery LLP

(57) ABSTRACT

The present invention provides a message processing method of a gateway, which can improve the reliability of a routing operation of the gateway by changing the moment of message transmission. The message processing method of the gateway includes steps of (a) calculating a time difference between the transmission time of a message transmitted to the gateway and the transmission time of a message routed and transmitted from the gateway, and (b) comparing the transmission period of the message transmitted to the gateway and the transmission period of the message routed and transmitted from the gateway, when the time difference is less than a target value. (c) A message transmission timing offset is calculated according to the compared result between the transmission periods of the messages, and (d) the transmission time of the message transmitted to the gateway is changed and corrected using the message transmission timing offset.

9 Claims, 5 Drawing Sheets

(56) References Cited

FOREIGN PATENT DOCUMENTS

| KR | 10-2010-062786 A | 6/2010 |
| KR | 10-2012-0022194 A | 3/2012 |
| KR | 10-2012-0067696 A | 6/2012 |
| WO | 2011/077574 A1 | 6/2011 |

* cited by examiner

When latency is ensured
(it is unnecessary to control moment of message transmission)
(a)

When latency is not ensured
(it is necessary to control moment of message transmission
(b)

MESSAGE PROCESSING METHOD OF GATEWAY

CROSS-REFERENCE TO RELATED APPLICATION

This application claims under 35 U.S.C. §119(a) the benefit of Korean Patent Application No. 10-2013-0096479 filed Aug. 14, 2013, the entire contents of which are incorporated herein by reference.

TECHNICAL FIELD

The present invention relates to a message processing method of a gateway. More particularly, the present invention relates to a message processing method of a gateway, which can improve the reliability of the routing operation of the gateway by changing the moment of message transmission.

BACKGROUND

With a rapid increase in electronic technologies related to vehicles, the types and numbers of electronic controllers required in vehicles have also been rapidly increasing. Accordingly, the amount of information necessary for communication between controllers has correspondingly increased. The increase in the amount of information, however, has lowered the efficiency in the communication of information between controllers using an existing single communication channel, and has also reduced communication reliability.

In order to solve these problems, gateways using several communication channels have been provided. The gateways route necessary data in other channels, thereby maintaining necessary communication while minimizing the communication load applied to one communication channel.

As the vehicle control through cooperation between controllers is increased in the use of the gateway, the reliability of communication becomes further important. Hence, it is necessary to ensure the reliability of a routing function of the gateway.

The gateway routes data, such as a message, so that the communication between different communication channels (networks) is possible. Here, the routing refers to an operation of processing and transmitting the format of a transmission message to be suitable for the communication protocol of a communication channel through which a message is received.

The basic function of the gateway will be described below as examples.

As an example, in a case where controllers of a body part in a vehicle use a low-speed controller area network (CAN) communication and controllers of a chassis part in the vehicle use a high-speed CAN communication, the communication method of the controllers of the body part is different from that of the controllers of the chassis part when the communication between the controllers using two channels is required, (i.e., when the communication between the controllers of the body part using the low-speed CAN communication and the controllers of the chassis part using the high-speed CAN communication is required). Hence, it is impossible to perform direct communication between the controllers using the two channels.

In this case, data received through each communication channel is transformed and transmitted suitable for the communication protocol of a corresponding channel (a channel to receive the data), using the gateway, so that communication between two channels different from each other is possible.

As another example, as the number of controllers using one communication channel is increased, even though there is no difference in the communication method between controllers in a vehicle, the overload of communication channels, such as bus load or latency, occurs. Therefore, the reliability of communication is lowered, and hence the gateway is used even when the one channel is separated into a plurality of channels.

In this case, the gateway performs a function of extracting only messages necessary for a corresponding controller (or server) and routing the extracted messages from another channel.

The bus load refers to a degree to which messages of controllers occupy, per unit time, the CAN bus of a network, and the latency refers to a degree to which the transmission of each message is delayed. Generally, if the bus load is increased, the latency is increased.

The routing as a major function of the gateway can be divided into direct routing, indirect routing, and message and signal routing.

Direct routing is a method in which data received from a transmission channel is transmitted to a reception channel without any separate transformation. Since the data is transmitted to the reception channel as it is, a separate processing process is not required. In this case, the gateway serves as only a simple repeater.

In order to perform direct routing, both channels repeated by the gateway should be configured with the same topology.

Indirect routing is a method applied when the structure of a received message is maintained as it is, but transformation of a transmission period, transmission scheme, or the like is required. In the method, the routing is performed by changing a characteristic of the message, such as a transmission period, while maintaining the structures of starting bits of data constituting the message as they are.

In indirect routing, since the format of data is also maintained, (i.e., since the routing is performed without the transformation of a message), both channels repeated by the gateway should be configured with the same topology.

Signal routing is a method in which the routing is performed by reconstructing data of a message on a transmission channel to be suitable for characteristics of a reception stage or to be suitable for the intention of a designer.

In signal routing, although both the channels have different network topologies, a new message can be routed suitable for the topology of the reception stage.

Meanwhile, electronic controllers in a vehicle construct a monitoring system called "Watchdog" to protect against problems that may occur on software. The monitoring system monitors whether a system in the vehicle is in an idle state caused by a mechanical fault or in an unlimited loop state caused by a program mistake.

An error may occur in the routing process of the gateway described above. The gateway has a Watchdog function for detecting an error of software, using one controller. However, the Watchdog function is generally limited to the function of monitoring an abnormal operation of software.

While a general controller recognizes and receives only a message necessary therefor, the gateway receives, routes, and transmits a large number of messages for the purpose of routing. Therefore, although the gateway performs a normal process, an error may occur in the routing of the gateway due to a change in the external condition, such as an increase in latency.

Particularly, in a case where different communication topologies such as Ethernet, CAN, and Flexray are used, variables in communication are increased by different transmission speed and characteristics. The error occurring due to such a reason is not an error related to the process of software. Hence, the error cannot be detected using a monitoring system such as Watchdog.

In addition, messages participating in general communication generate checksum codes to prevent erroneous data from being transmitted due to a problem in communication, thereby ensuring the reliability of an error that may occur on communication. However, the message routed through the signal routing is newly encoded by passing through the gateway, and hence the checksum codes cannot be used in different communication channels.

In other words, the gateway causes reliability problems due to the following reasons.

First, the gateway is a kind of controller which performs a function of receiving/transmitting a large amount of data on communication, but there is a limitation in detecting an abnormal operation, using the Watchdog that is a monitoring system of the general controller.

Second, in the routing as a major function of the gateway, it is likely that an error may occur due to an external problem of software.

SUMMARY

The present invention provides a message processing method of gateway, which can improve the reliability of routing of the gateway by changing the moment of message transmission to ensure the maximum allowable latency between a message transmitted to the gateway for routing the message and a message routed and transmitted to another channel.

In one aspect, the present invention provides a message processing method of a gateway, the method including the steps of: (a) calculating a time difference between the transmission time of a message transmitted to the gateway and the transmission time of a message routed and transmitted from the gateway, and (b) comparing the transmission period of the message transmitted to the gateway and the transmission period of the message routed and transmitted from the gateway, when the time difference is less than a target value. (c) A message transmission timing offset is calculated according to the compared result between the transmission periods of the messages, and (d) the transmission time of the message transmitted to the gateway is changed and corrected, using the message transmission timing offset.

In an exemplary embodiment, in step (c), when the transmission period of a message (Tx) prior to the routing is equal to the transmission period of a message (Rx) posterior to the routing, the message transmission timing offset ($Tx_{Offset}$) may be calculated according to $Tx_{Offset}=P_{Rx}/2-\Delta t$, wherein $\Delta t=t_{Rx}-t_{Tx}$. In this case, $\Delta t$ may be a value smaller than $0.4 \cdot P_{Tx}$.

Here, $t_{Rx}$ is the transmission time of the message (Rx) posterior to the routing, $t_{Tx}$ is the transmission time of the message (Tx) prior to the routing, $P_{Tx}$ is the transmission period of the message (Tx) prior to the routing, and $P_{Rx}$ is the transmission period of the message (Rx) posterior to the routing.

In another exemplary embodiment, in step (c), when the transmission period of the message (Tx) prior to the routing is greater than the transmission period of the message (Rx) posterior to the routing, the message transmission timing offset ($Tx_{Offset}$) may be calculated according to $Tx_{Offset}=P_{Rx}/2-\Delta t$, wherein $\Delta t=t_{Rx}-t_{Tx}$. In this case, $\Delta t$ may be a value smaller than '$0.4 \cdot P_{Rx}$'.

In still another exemplary embodiment, in step (c), when the transmission period of the message (Tx) prior to the routing is smaller than the transmission period of the message (Rx) posterior to the routing, the message transmission timing offset ($Tx_{Offset}$) may be calculated according to $Tx_{Offset}=P_{Tx}/2-\Delta t$, wherein $\Delta t=t_{Rx}-t_{Tx}$. In this case, $\Delta t$ may be a value smaller than $0.4 \cdot P_{Tx}$.

In yet another exemplary embodiment, after the correction in step (d) is completed with respect to all messages transmitted to the gateway, step (d) may include deciding whether the message posterior to the routing maintains previous data by comparing the messages prior and posterior to the routing, and calculating a message transmission timing offset when the message posterior to the routing maintain the previous data, and changing the transmission time of the message to the gateway, using the calculated offset.

In still yet another exemplary embodiment, the message transmission timing offset may be calculated using $Tx_{Offset}=0.1 \times \min(P_{Tx}, P_{Rx})$ when the time difference between the transmission time of the message prior to the routing and the transmission time of the message posterior to the routing is no more than $\min(P_{Tx}, P_{Rx})/2$.

Here, $t_{Rx}$ is the transmission time of the message (Rx) posterior to the routing, $t_{Tx}$ is the transmission time of the message (Tx) prior to the routing, $P_{Tx}$ is the transmission period of the message (Tx) prior to the routing, and $P_{Rx}$ is the transmission period of the message (Rx) posterior to the routing.

In a further exemplary embodiment, the message transmission timing offset may be calculated using $Tx_{Offset}=-0.1 \times \min(P_{Tx}, P_{Rx})$ when the time difference between the transmission time of the message prior to the routing and the transmission time of the message posterior to the routing is greater than $\min(P_{Tx}, P_{Rx})/2$.

Other aspects and exemplary embodiments of the invention are discussed infra.

In the message processing method of a gateway according to the present invention, the difference between the transmission time of the message transmitted to the gateway and the transmission time of the message routed and transmitted from the gateway is maintained greater than the allowable latency in the message transmission by changing and correcting the moment of message transmission at the controller that transmits the message to the gateway, so that it is possible to prevent an error from occurring in the routing process of the gateway and to improve the reliability of the routing of the gateway.

The above and other features of the disclosure are discussed infra.

BRIEF DESCRIPTION OF THE DRAWINGS

The above and other features of the present disclosure will now be described in detail with reference to certain exemplary embodiments thereof illustrated by the accompanying drawings which are given hereinbelow by way of illustration only, and thus are not limitative of the present disclosure.

Figure 1:
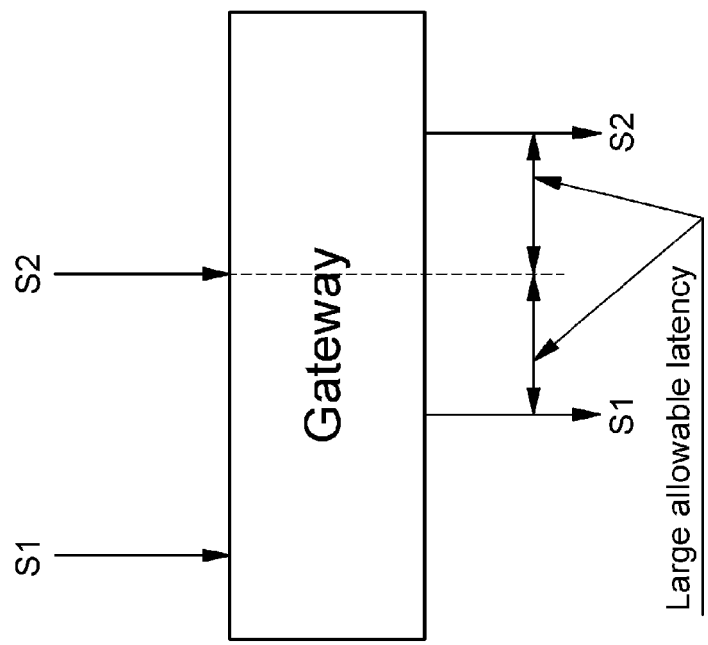
FIG. 1 is a schematic view illustrating a message processing method of a gateway according to an embodiment of the present disclosure.
Figure 1:
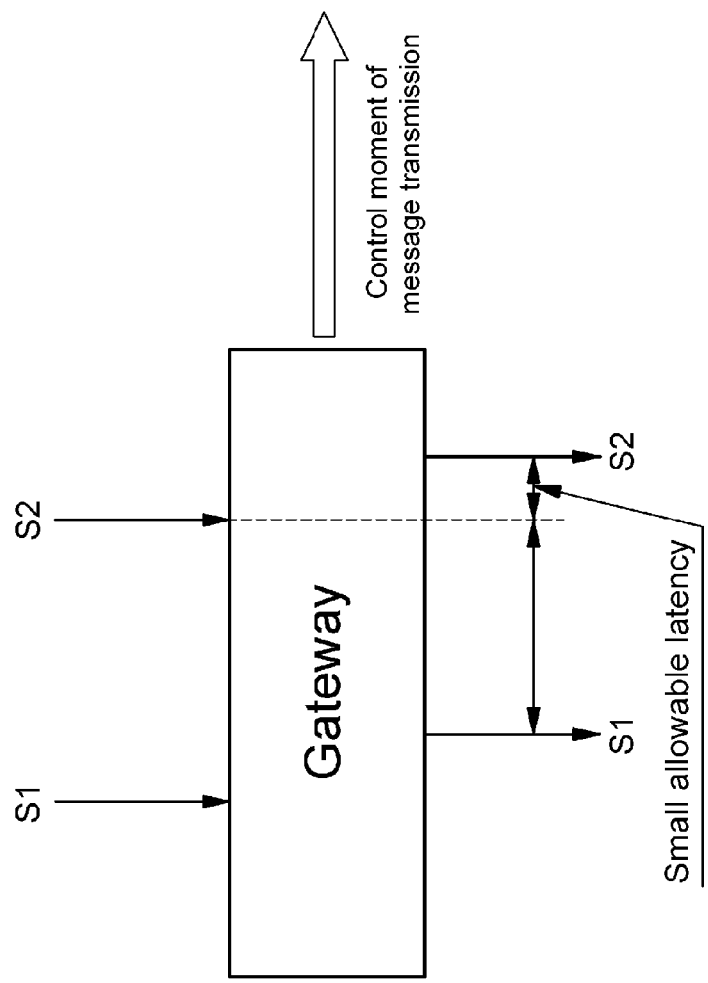

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents, and other embodiments, which may be included within the spirit and scope of the invention as defined by the appended claims.

The present invention provides a message processing method of a gateway, which can improve the reliability of a routing operation by changing the moment of message transmission of the gateway.

Accordingly, in the present invention, the moment of message transmission is changed to ensure the maximum allowable latency between a message transmitted to the gateway for routing the message and a message routed and transmitted to another channel.

In other words, when the gateway receives a message from a transmission channel and then transmits the received message to a reception channel through a routing process for the purpose of communication between different communication channels, the moment of message transmission is changed in the direction of increasing an allowable latency as shown in FIG. 1, thereby preventing a malfunction of an electronic controller receiving the corresponding message.

The correction for the moment of message transmission includes entire correction in which the correction is initially performed on all messages in the ignition-on state of a vehicle, and partial correction in which the correction is performed on a message in which an error occurs after the ignition-off state of the vehicle.

In other words, the correction for the moment of message transmission may be divided into an initial correction in which the correction is entirely performed on all messages in the ignition-on state of the vehicle, and intermediate correction, in which the correction is partially performed on only a message in which an error occurs after ignition-on of the vehicle.

Figure 2:
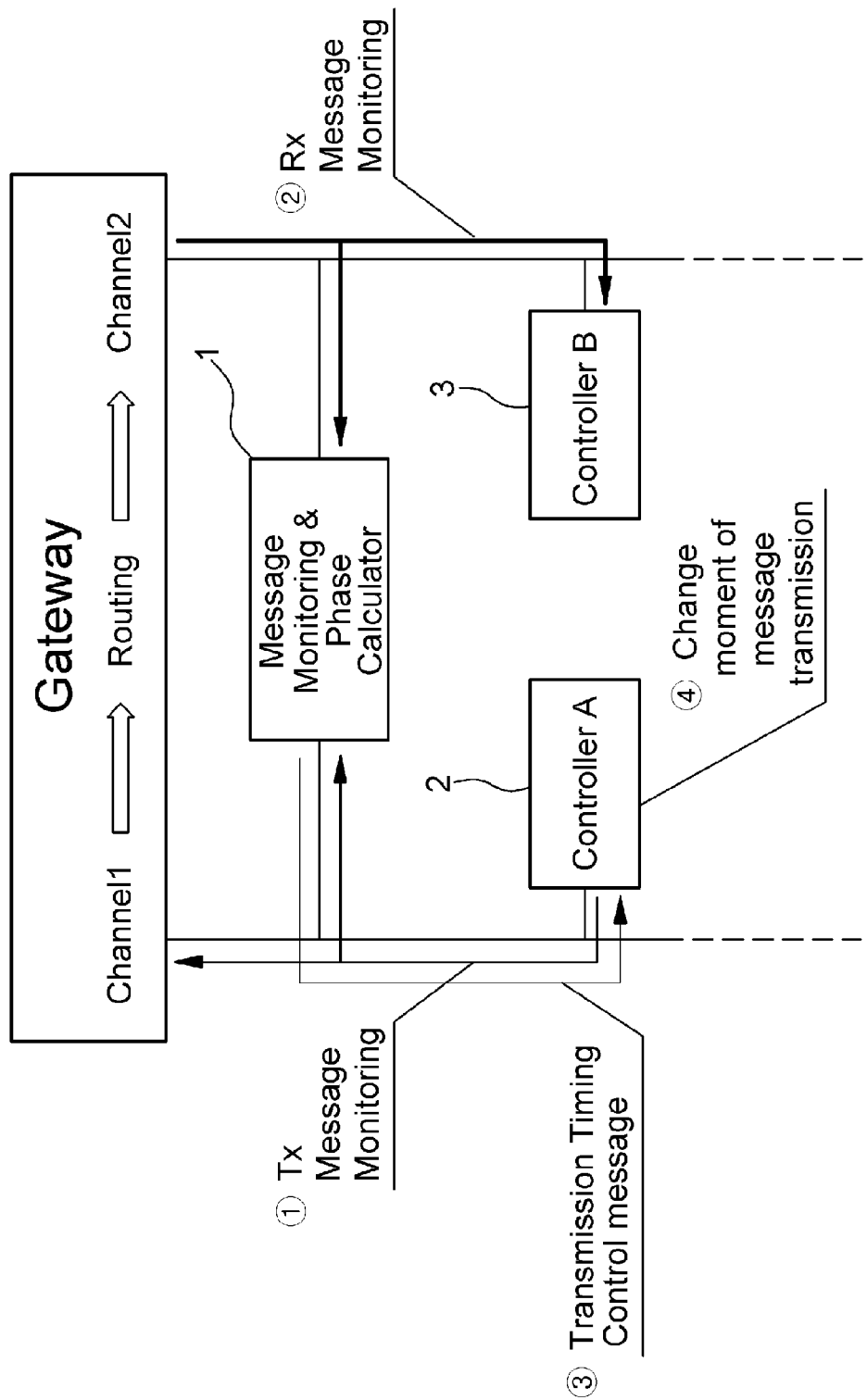
FIGS. 2 to 4 are views illustrating the message processing method of the gateway according to the embodiment of the present disclosure.

In order to perform the initial correction (or initial timing correction), a message monitoring & phase calculator (MMPC) of the gateway shown in FIG. 2 identifies the transmission time of a message transmitted from a first controller (or transmission controller) to the gateway and the transmission time of a message routed in the gateway and transmitted to a second controller (or reception controller), and calculates a latency (or time difference) between the transmission times.

If the calculated latency is less than a target value, the MMPC calculates a transmission timing offset at which the maximum latency margin can be ensured, and transmits information on the calculated transmission timing offset (a transmission timing control message of FIG. 2) to the first controller as shown in FIG. 2.

The first controller maximally ensures the latency by changing the moment of message transmission, based on the information (the transmission timing control message of FIG. 2) provided from the MMPC.

In this case, the first controller can delay controller area network (CAN) transmit timing, (i.e., the moment of message transmission by the transmission timing offset), using a micro controller unit (MCU) timer. The first controller transmits a message in synchronization with a message transmission period based on the corrected (delayed) transmission timing.

In a case where the previous data is maintained by comparing a message (Tx message) prior to the routing and a message (Rx message) posterior to the routing after the initial routing the MMPC again controls the moment of message transmission.

In other words, in a case where the message (Rx) posterior to the routing, transmitted from the gateway, maintains data previously transmitted from the gateway as a result obtained by comparing the message (Tx) prior to the routing and the message (Rx) posterior to the routing after the initial correction, the MMPC changes the moment of message transmission through the intermediate correction.

The initial correction is performed after a certain time (e.g., 500 ms) in the ignition-on state of the vehicle. The initial correction is performed under a condition in which all messages are awakened.

That is, the initial correction is performed under a condition in which all the messages of the first controller are awakened and then transmitted to the gateway after ignition-on of the vehicle.

In a case where the moment of message transmission is changed, the MMPC identifies whether the transmission time of the message (Tx message) prior to the routing (i.e., the time when the message is transmitted from the first controller to the gateway) is the transmission time of the message (Rx message) posterior to the routing (i.e., the time when the message is transmitted from the gateway to the second controller).

Figure 3:
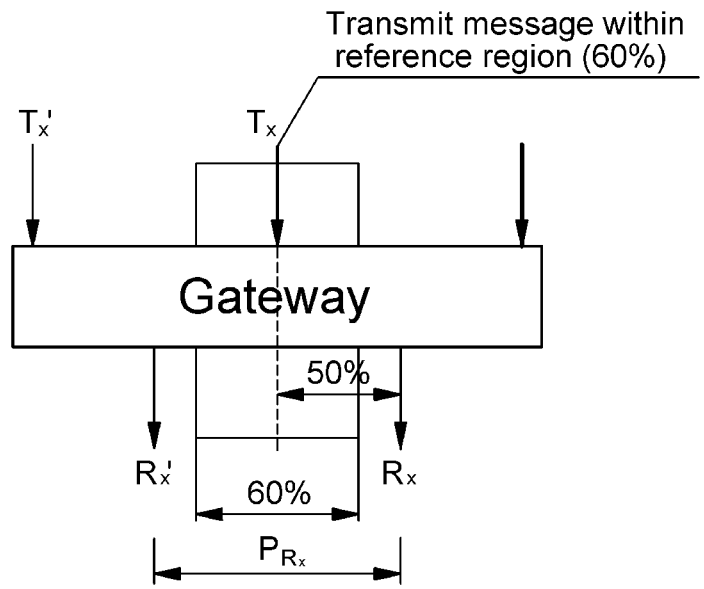
Figure 3:
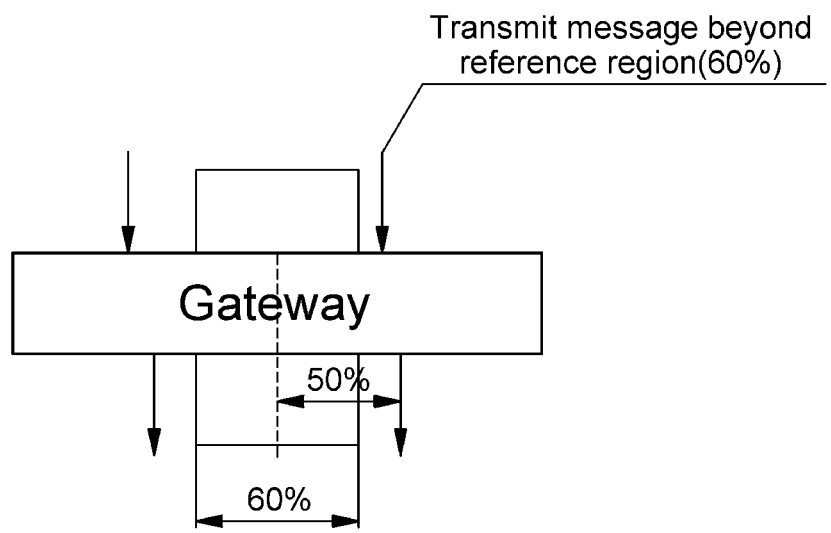

As shown in FIG. 3, the MMPC can ensure the maximum latency margin when the transmission time of the message (Tx) prior to the routing is an intermediate time of the transmission period, which is 50% of the transmission time of the message (Rx) posterior to the routing.

In other words, the MMPC can ensure the maximum latency margin when the transmission time of the message (Tx) prior to the routing corresponds to the intermediate time between a message (Rx') posterior to first routing and a message (Rx) posterior to second routing.

In this case, the message (Rx') posterior to the first routing is a message transmitted before the message (Rx) posterior to the second routing is transmitted, and the message (Rx) posterior to the second routing is a message obtained by transmitting the message (Tx) prior to the routing through the gateway.

In a case where the message is not transmitted within a time margin corresponding to the region of 60% of the transmission period, based on the intermediate time of the transmission period ($P_{Rx}$) of the message (Rx) posterior to the routing, which can ensure the maximum latency margin, the MMPC may decide that control of the moment of message transmission is required.

In other words, in order to determine whether it is required to control the transmission time of the message (Tx) prior to the routing, the MMPC determines whether the transmission time of the message (Tx) prior to the routing is included in the time of 20 to 80% of the transmission period of the message (Rx) posterior to the routing. In a case where it is determined that the transmission time of the message (Tx) prior to the routing is not included in the time of 20 to 80% of the transmission period of the message (Rx) posterior to the routing, the MMPC determines that the latency is less than the target value. The MMPC determines that the moment of message transmission is necessarily changed to ensure the latency margin.

In a case where the transmission period of the message (Tx) prior to the routing is equal to that of the message (Rx) posterior to the routing, the MMPC determines whether it is necessary to change the transmission time of the message (Tx) prior to the routing, based on the transmission period of the message (Tx) prior to the routing or the message (Rx) posterior to the routing. In a case where the transmission period of the message (Tx) prior to the routing is smaller than that of the message (Rx) posterior to the routing, the MMPC determines whether it is necessary to change the transmission time of the message (Tx) prior to the routing, based on the transmission period of the message (Tx) prior to the routing. In a case where the transmission period of the message (Tx) prior to the routing is greater than that of the message (Rx) posterior to the routing, the MMPC determines whether it is necessary to change the transmission time of the message (Tx) prior to the routing, based on the transmission period of the message (Rx) posterior to the routing.

That is, the MMPC determines whether it is necessary to change the transmission time of the message (Tx) prior to the routing, based on a shorter one of the transmission periods of the message (Tx) prior to the routing and the message (Rx) posterior to the routing.

Figure 4:
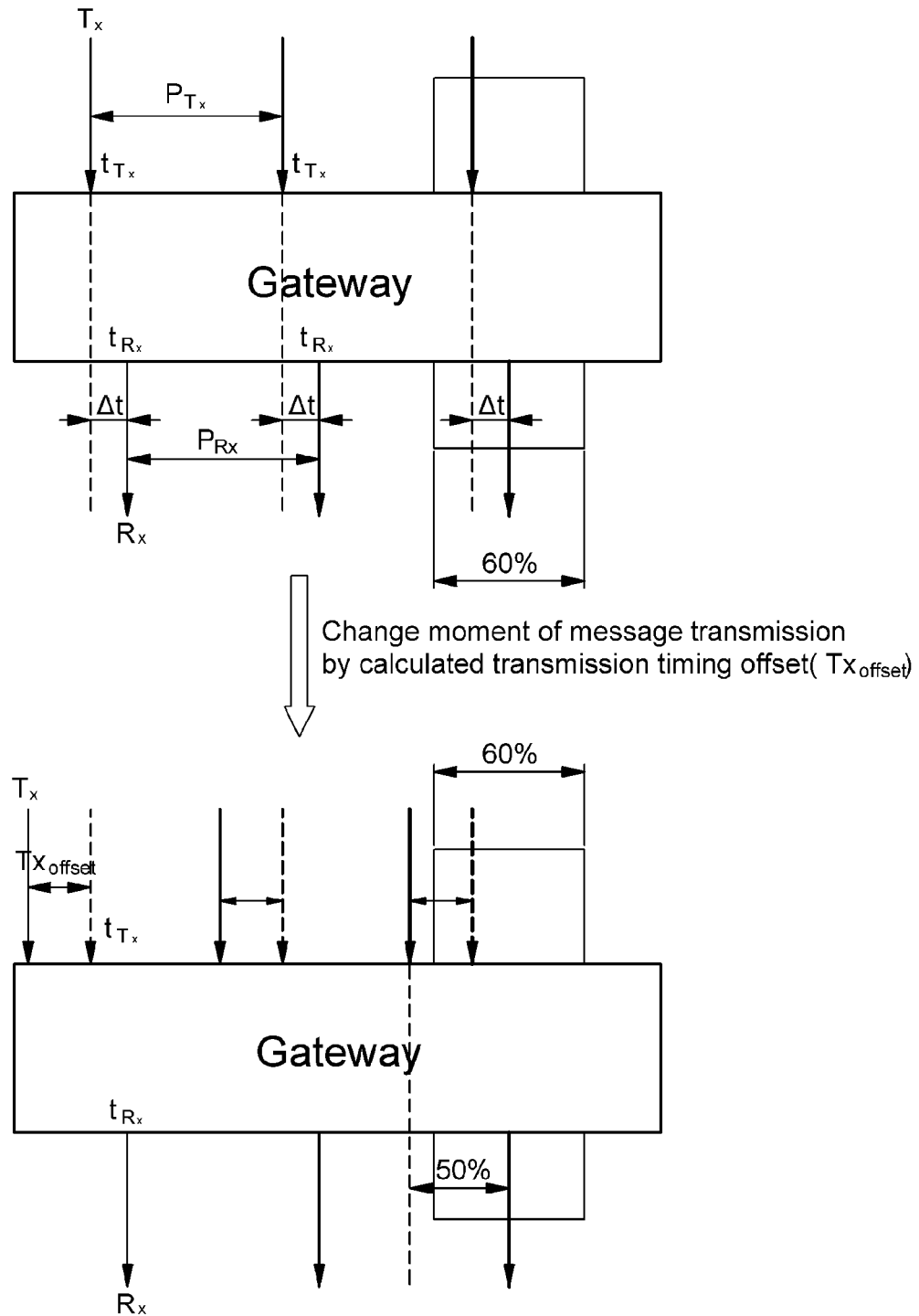
Figure 5:
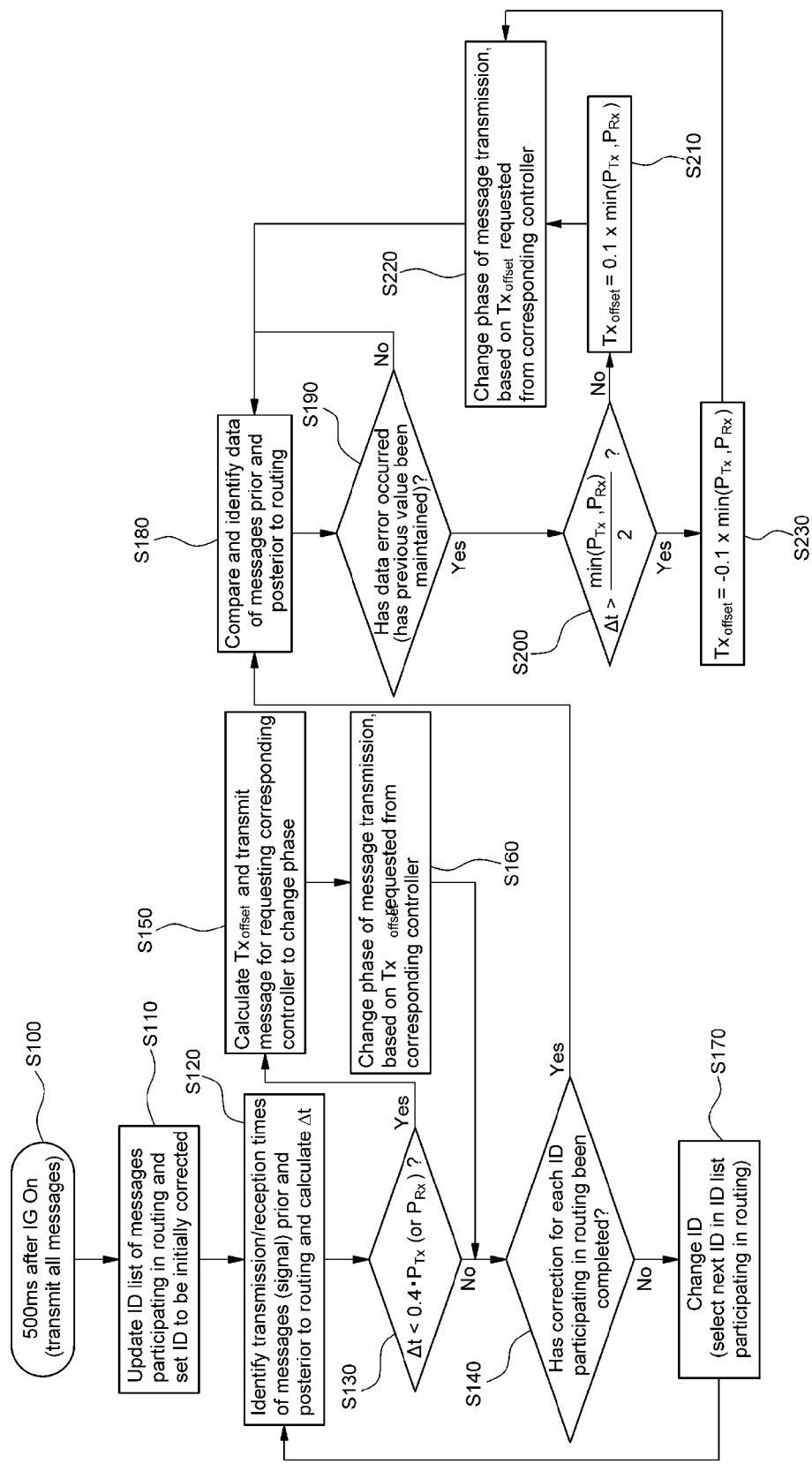
FIG. 5 is a flowchart illustrating the message processing method of the gateway according to the embodiment of the present disclosure.

In a case where it is necessary to change the transmission time of the message (Tx) prior to the routing, the message transmission timing offset ($Tx_{Offset}$) may be calculated as follows with reference to FIG. 4.

First, in a case where the transmission period of the message (Tx) prior to the routing is equal to that of the message (Rx) posterior to the routing, the message transmission timing offset ($Tx_{Offset}$) may be calculated as shown in the following Equation 1.

$$Tx_{Offset} = \frac{P_{Rx}}{2} - \Delta t \qquad \text{Equation 1}$$

where $$\Delta t = t_{Rx} - t_{Tx}$$

Here, $t_{Rx}$ denotes the transmission time of the message (Rx) posterior to the routing, $t_{Tx}$ denotes the transmission time of the message (Tx) prior to the routing, and $P_{Rx}$ denotes the transmission period of the message (Rx) posterior to the routing.

Equation 1 corresponds to a case where the condition of $|\Delta t|<0.4 \cdot P_{Rx}$ is satisfied.

In a case where the transmission period of the message (Tx) prior to the routing is greater than that of the message (Rx) posterior to the routing, the message transmission timing offset ($Tx_{Offset}$) may be calculated as shown in the following Equation 2.

$$Tx_{Offset} = \frac{P_{Rx}}{2} - \Delta t \qquad \text{Equation 2}$$

where $$\Delta t = t_{Rx} - t_{Tx}$$

Equation 2 corresponds to a case where the condition of $|\Delta t|<0.4 \cdot P_{Rx}$ is satisfied.

In a case where the transmission period of the message (Tx) prior to the routing is smaller than that of the message (Rx) posterior to the routing, the message transmission timing offset ($Tx_{Offset}$) may be calculated as shown in the following Equation 3.

$$Tx_{Offset} = \frac{P_{Tx}}{2} - \Delta t \qquad \text{Equation 3}$$

where $$\Delta t = t_{Rx} - t_{Tx}$$

Equation 3 corresponds to a case where the condition of $|\Delta t|<0.4 \cdot P_{Rx}$ is satisfied, and $P_{Rx}$ denotes the transmission period of the message (Rx) posterior to the routing.

The message transmission timing offset ($Tx_{Offset}$) is applied in the initial correction, so that it is possible to ensure the reliability of the routing of the gateway through the initial correction.

The message transmission timing offset ($Tx_{Offset}$) may be applied when the MMPC transmits a transmission timing control message to the first controller and requests the first controller to change the moment of message transmission (the transmission time of the message (Tx) prior to the routing). The transmission timing control message transmitted to the first controller includes an identity (ID), a date length code (DLC), a message identifier and a message transmission timing offset ($Tx_{Offset}$). Thus, the transmission timing control message participates in only the change of the transmission time of the message (Tx) prior to the routing.

Since an error of the moment of message transmission may occur in a controller in the vehicle after the initial setup and correction, it is necessary to continuously perform monitoring and correction.

Thus, in order to ensure the reliability of the routing of the gateway after the initial correction, intermediate correction is performed when necessary, and the correction is performed on only a message in which an error occurs (when the second controller maintains a previous value).

In a case where an error occurs in one message after the initial correction, the moment of message transmission is corrected and changed by applying a message transmission timing offset ($Tx_{Offset}$) corresponding to 10% of the transmission period.

Accordingly, it is possible to ensure the reliability of the routing of the gateway after the initial correction, and simultaneously, it is possible to prevent an excessive countermeasure against an error caused by an instantaneously large latency.

In a case where an instantaneously large latency occurs in the transmission of a message, the moment of message transmission is considerably changed, so that the message (Rx) posterior to the routing can maintain a previous value.

In intermediate correction, when data of the message (Tx) prior to the routing and the message (Rx) posterior to the routing, which are monitored by the MMPC, are different from each other (i.e., when the message (Rx) posterior to the routing maintains the previous value (previous data), the moment of message transmission is changed).

In intermediate correction, the message transmission timing offset ($Tx_{Offset}$) may be calculated as shown in the following Equation 4.

$$Tx_{Offset} = 0.1 \times \min(P_{Tx}, P_{Rx}) \qquad \text{Equation 4}$$

In $\min(P_{Tx}, P_{Rx})$, a small one of $P_{Tx}$ and $P_{Rx}$ is selected.

Here, $P_{Tx}$ denotes the transmission period of the message (Tx) prior to the routing, and $P_{Rx}$ denotes the transmission period of the message (Rx) posterior to the routing.

Equation 4 corresponds to a case where the transmission of a message is delayed by an instantaneous latency. Equation 4 corresponds only to a case where the condition of $\Delta t = t_{Rx} - T_{Tx}$ and $t \leq \min(P_{Tx}, P_{Rx})/2$ is satisfied.

Here, $t_{Rx}$ denotes the transmission time of the message (Rx) posterior to the routing, and $t_{Tx}$ denotes the transmission time of the message (Tx) prior to the routing.

$$Tx_{Offset} = -0.1 \times (P_{Tx}, P_{Rx}) \qquad \text{Equation 5}$$

Equation 5 corresponds to a case where the transmission of a message is sped up by an instantaneous latency. Equation 5 corresponds to only a case where the condition of $\Delta t = t_{Rx} - T_{Tx}$ and $t > \min(P_{Tx}, P_{Rx})/2$ is satisfied.

In the intermediate correction, a message transmission timing offset ($Tx_{Offset}$) of 10% is applied according to whether the error caused by the latency occurs when the transmission time is delayed or when the transmission time is quickened.

Accordingly, it is possible to ensure the reliability of the routing of the gateway by controlling a fine transmission time (timing).

The message processing procedure described above will be described as follows.

In the ignition-on state of the vehicle, the MMPC allows all messages to be awakened and transmitted to the gateway after a certain time (S100).

The MMPC updates the ID list of messages participating in routing of the gateway, and sets an ID for initial correction with respect to each message (S110).

Next, the MMPC identifies transmission times of messages prior and posterior to the routing (transmission times of a message (Tx) prior to the routing and a message (Rx) posterior to the routing) and then calculates a time difference ($|\Delta t|$) between the transmission time of the message (Tx) prior to the routing and the transmission time of the message (Rx) posterior to the routing (S120).

As the calculated result, the MMPC decides whether the time difference ($|\Delta t|$) satisfies a condition of $|\Delta t| < 0.4 \cdot P_{Tx}$ or $|\Delta t| < 0.4 \cdot P_{Rx}$ according to the comparison result between the transmission period of the message (Tx) prior to the routing and the transmission period of the message (Rx) posterior to the routing (S130).

In a case where the condition is satisfied, the MMPC calculates a message transmission timing offset ($Tx_{Offset}$) and transmits a message for requesting a corresponding controller (first controller) to change the moment of message transmission (S150). The controller changes the moment of message transmission, based on the message transmission timing offset ($Tx_{Offset}$) (S160). Subsequently, the MMPC decides whether the initial correction of each message participating in the routing of the gateway has been completed (S140).

In a case where the time difference ($|\Delta t|$) does not satisfy the condition of $|\Delta t| < 0.4 \cdot P_{Tx}$ or $|\Delta t| < 0.4 \cdot P_{Rx}$, the MMPC also decides whether the initial correction of each message participating in the routing of the gateway has been completed (S140).

In a case where it is decided that the initial correction has not been completed, the MMPC selects a next ID in the ID list of the messages participating in the routing (S170), and again identifies the transmission times of the messages prior and posterior to the routing (S120). In a case where it is decided that the initial correction has been completed, the MMPC compares data on the messages prior and posterior to the routing (S180), and identifies whether an error occurs in that previous data is maintained (S190).

In a case where the data error occurs, the MMPC decides whether the time difference ($\Delta t$) between the transmission time of the message (Tx) prior to the routing and the transmission time of the message (Rx) posterior to the routing has a value greater than $\min(P_{Tx}, P_{Rx})/2$ (S200). As a decided result, the MMPC changes the moment of message transmission of a corresponding controller (first controller or transmission controller) (S220), using an appropriate message transmission timing offset ($Tx_{Offset}$) in Equations 4 and 5 (S210 and S230).

If the time difference ($\Delta t$) satisfies the condition of $\Delta t > \min(P_{Tx}, P_{Rx})/2$, the MMPC uses the message transmission timing offset ($Tx_{Offset}$) according to Equation 5 (S230). If the time difference ($\Delta t$) does not satisfy the condition of $\Delta t > \min(P_{Tx}, P_{Rx})/2$, the MMPC uses the message transmission timing offset ($Tx_{Offset}$) according to Equation 4 (S210).

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A message processing method of a gateway, comprising the steps of:
    (a) calculating a time difference between a transmission time of a message transmitted to the gateway and a transmission time of a message routed and transmitted from the gateway;
    (b) comparing a transmission period of the message transmitted to the gateway and a transmission period of the message routed and transmitted from the gateway, when the time difference is less than a target value;
    (c) calculating a message transmission timing offset at which a maximum latency margin can be ensured according to the compared result between the transmission periods of the messages; and
    (d) changing and correcting the transmission time of the message transmitted to the gateway using the message transmission timing offset,
    wherein, after the correction in step (d) is completed with respect to all messages transmitted to the gateway, step (d) includes deciding whether the message posterior to the routing maintains a previous data by comparing the messages prior and posterior to the routing, and calculating a message transmission timing offset when the message posterior to the routing maintain the previous data and changing the transmission time of the message to the gateway, using the calculated offset.

2. The message processing method of claim 1, wherein in step (c), when the transmission period of a message (Tx) prior to the routing is equal to the transmission period of a message (Rx) posterior to the routing, the message transmission timing offset ($Tx_{offset}$) is calculated according to $Tx_{Offset} = P_{Rx}/2 - \Delta t$,
    wherein $\Delta t = t_{Rx} - t_{Tx}$, $t_{Rx}$ is the transmission time of the message (Rx) posterior to the routing, $t_{Tx}$ is the transmission time of the message (Tx) prior to the routing, $P_{Tx}$ is the transmission period of the message (Tx) prior to the routing, and $P_{Rx}$ is the transmission period of the message (Rx) posterior to the routing.

3. The message processing method of claim 2, wherein $\Delta t$ is a value smaller than $0.4 \cdot P_{Tx}$, wherein $P_{Tx}$, is the transmission period of the message (Tx) prior to routing.

4. The message processing method of claim 1, wherein in step (c), when the transmission period of the message (Tx) prior to the routing is greater than the transmission period of the message (Rx) posterior to the routing, the message transmission timing offset ($Tx_{Offset}$) is calculated according to $Tx_{Offset} = P_{Rx}/2 - \Delta t$, wherein $\Delta t = t_{Rx} - t_{Tx}$, and $P_{Rx}$ is the transmission period of the message (Rx) posterior to the routing.

5. The message processing method of claim 4, wherein $\Delta t$ is a value smaller than $0.4 \cdot P_{Rx}$.

6. The message processing method of claim 1, wherein in step (c), when the transmission period of the message (Tx) prior to the routing is smaller than the transmission period of the message (Rx) posterior to the routing, the message transmission timing offset ($Tx_{Offset}$) is calculated according to $Tx_{Offset} = P_{Tx}/2 - \Delta t$, wherein $\Delta t = t_{Rx} - t_{Tx}$, and $P_{Tx}$ is the transmission period of the message (Tx) prior to the routing.

7. The message processing method of claim 6, wherein $\Delta t$ is a value smaller than $0.4 \cdot P_{Tx}$, wherein $P_{Tx}$ the transmission period of the message (Tx) prior to the routing.

8. The message processing method of claim 1, wherein the message transmission timing offset is calculated using $Tx_{offset} = 0.1 * \min(P_{Tx}, P_{Rx})$ when a time difference between the transmission time of the message prior to the routing and the transmission time of the message posterior to the routing is no more than $\min(P_{Tx}, P_{Rx})/2$, wherein $t_{Rx}$ is the transmission time of the message (Rx) posterior to the routing, $t_{Tx}$ is the transmission time of the message (Tx) prior to the routing, $P_{Tx}$ is the transmission period of the message (Tx) prior to the routing, and $P_{Rx}$ is the transmission period of the message (Rx) posterior to the routing.

9. The message processing method of claim 1, wherein the message transmission timing offset is calculated using $Tx_{offset} = 0.1 * \min(P_{Tx}, P_{Rx})$ when the time difference between the transmission time of the message prior to the routing and the transmission time of the message posterior to the routing is greater than $\min(P_{Tx}, P_{Rx})/2$, wherein $P_{Tx}$ is the transmission period of the message (Tx) prior to the routing, and $P_{Rx}$ is the transmission period of the message (Rx) posterior to the routing.

* * * * *